United States Patent [19]

Tran

[11] Patent Number: 5,496,441
[45] Date of Patent: Mar. 5, 1996

[54] UTILIZATION OF DEINKING BY-PRODUCT IN BUILDING MATERIALS

[75] Inventor: Hoc N. Tran, Toronto, Canada

[73] Assignee: Tran Industrial Research Inc., Toronto, Canada

[21] Appl. No.: 175,119

[22] Filed: Dec. 29, 1993

[30] Foreign Application Priority Data

May 26, 1993 [GB] United Kingdom ............ 9310891

[51] Int. Cl.⁶ .................................................. D21H 17/01
[52] U.S. Cl. .............. 162/181.3; 162/189; 162/DIG. 9; 106/650; 106/651; 106/653; 106/654; 156/39
[58] Field of Search .................... 162/189, DIG. 9, 162/181.3; 106/650, 651, 653, 654; 156/39

[56] References Cited

U.S. PATENT DOCUMENTS

| | | | |
|---|---|---|---|
| 3,188,751 | 6/1965 | Sutton | 162/DIG. 9 |
| 3,233,368 | 2/1966 | Price | 51/105 |
| 3,576,599 | 4/1971 | Anderson | 23/122 |
| 3,579,300 | 9/1969 | Bloom et al. | 23/122 |
| 3,737,265 | 6/1973 | Schafer et al. | 425/140 |
| 3,895,997 | 7/1975 | Haywood | 162/DIG. 9 |
| 3,944,698 | 3/1976 | Dierks et al. | 428/219 |
| 3,951,735 | 4/1976 | Kondo et al. | 162/133 |
| 3,954,555 | 5/1976 | Kole et al. | 162/136 |
| 3,961,105 | 6/1976 | Eberl et al. | 427/220 |
| 3,977,890 | 8/1976 | Jaunarajs et al. | 106/109 |
| 3,988,199 | 10/1976 | Hillmer et al. | 162/101 |
| 3,993,822 | 10/1976 | Knauf et al. | 428/213 |
| 4,018,963 | 4/1977 | Fuji et al. | 428/294 |
| 4,029,512 | 6/1977 | Jaunarajs et al. | 106/109 |
| 4,127,628 | 10/1978 | Uchida et al. | 264/42 |
| 4,133,928 | 1/1979 | Riley et al. | 428/255 |
| 4,152,408 | 5/1979 | Winslow | 423/555 |
| 4,195,110 | 3/1980 | Dierks et al. | 428/218 |
| 4,239,716 | 12/1980 | Ishida et al. | 264/86 |
| 4,265,979 | 5/1981 | Baehr et al. | 428/171 |
| 4,270,954 | 6/1981 | Aignesberger et al. | 106/47 R |
| 4,296,089 | 10/1981 | Aignesberger et al. | 423/555 |
| 4,328,178 | 4/1982 | Kossatz | 264/69 |
| 4,392,896 | 7/1983 | Sakakibara | 156/39 |
| 4,645,548 | 2/1987 | Take et al. | 156/39 |
| 4,734,163 | 3/1988 | Eberhardt et al. | 162/181.3 |
| 4,840,688 | 6/1989 | Vogt | 156/39 |
| 4,842,842 | 6/1989 | Kudo | 423/554 |
| 4,864,066 | 9/1989 | Gerhardt | 425/84 |
| 4,942,003 | 7/1990 | Bold | 264/40.4 |
| 4,965,031 | 10/1990 | Conroy | 264/122 |

(List continued on next page.)

FOREIGN PATENT DOCUMENTS

| | | | |
|---|---|---|---|
| 48-35354 | 10/1973 | Japan | 162/DIG. 9 |
| 1275042 | 5/1972 | United Kingdom | 162/DIG. 9 |
| 1441234 | 6/1976 | United Kingdom | 162/DIG. 9 |

OTHER PUBLICATIONS

Takats et al., "Suitability of fiber sludge as reinforcing material for manufacturing of gypsum fiberboards", pp. 97–103

Bahner et al., "Low–cost retrofitting of existing gypsum board lines to produce value–added gypsym–fiber products", pp. 90–96.

Petersen, Willy, "Fields of application and production experience gained with gypsum fiberboards", pp. 83–87.

*Primary Examiner*—Peter Chin
*Attorney, Agent, or Firm*—Sim & McBurney

[57] ABSTRACT

Deinking by-product from wastepaper recycling operations and pulp mill clarifier sludge are incorporated into drywall or other gypsum-based building products, such as building blocks. The deinking by-product or pulp mill clarifier sludge is diluted and mixed with stucco (calcium sulfate hemihydrate). The resulting slurry preferably is subjected to an initial dewatering, following the on-set of hardening of the gypsum, and drywall or other building product is formed from the dewatered material. A significant loading of fibrous material in the drywall sheet or other gypsum product is achieved using the procedure, imparting improved flexural strength to the product. The preferred procedure also may be used to incorporate virgin or recycled wood pulp into the building product.

12 Claims, 5 Drawing Sheets

DBP-REINFORCED DRYWALL MANUFACTURING PROCESS

U.S. PATENT DOCUMENTS

| | | | |
|---|---|---|---|
| 4,966,739 | 10/1990 | Stipek et al. | 264/87 |
| 5,011,668 | 4/1991 | Bail et al. | 423/171 |
| 5,021,093 | 6/1991 | Beshay | 106/731 |
| 5,051,221 | 9/1991 | Bold | 264/155 |
| 5,085,929 | 2/1992 | Bruce et al. | 428/309.9 |
| 5,102,596 | 4/1992 | Lampfer et al. | 264/115 |
| 5,116,671 | 5/1992 | Bruce et al. | 428/309.9 |
| 5,154,874 | 10/1992 | Koslowski | 264/333 |
| 5,171,366 | 12/1992 | Richards et al. | 106/772 |
| 5,198,052 | 3/1993 | Ali | 156/45 |
| 5,215,625 | 6/1963 | Burton | 162/DIG. 9 |
| 5,220,762 | 6/1993 | Lehnert et al. | 52/408 |
| 5,230,959 | 7/1993 | Young, Sr. et al. | 428/372 |
| 5,246,654 | 9/1993 | Ertle et al. | 294/118 |
| 5,248,487 | 9/1993 | Bold et al. | 473/171 |
| 5,256,222 | 10/1993 | Shepherd et al. | 156/41 |
| 5,262,003 | 11/1993 | Chupka et al. | 162/4 |
| 5,264,257 | 11/1993 | Martinez et al. | 428/2 |
| 5,266,287 | 11/1993 | Johnson | 423/243.08 |
| 5,277,100 | 1/1994 | Shinohara | 91/376 |
| 5,277,856 | 1/1994 | Bucking | 264/112 |

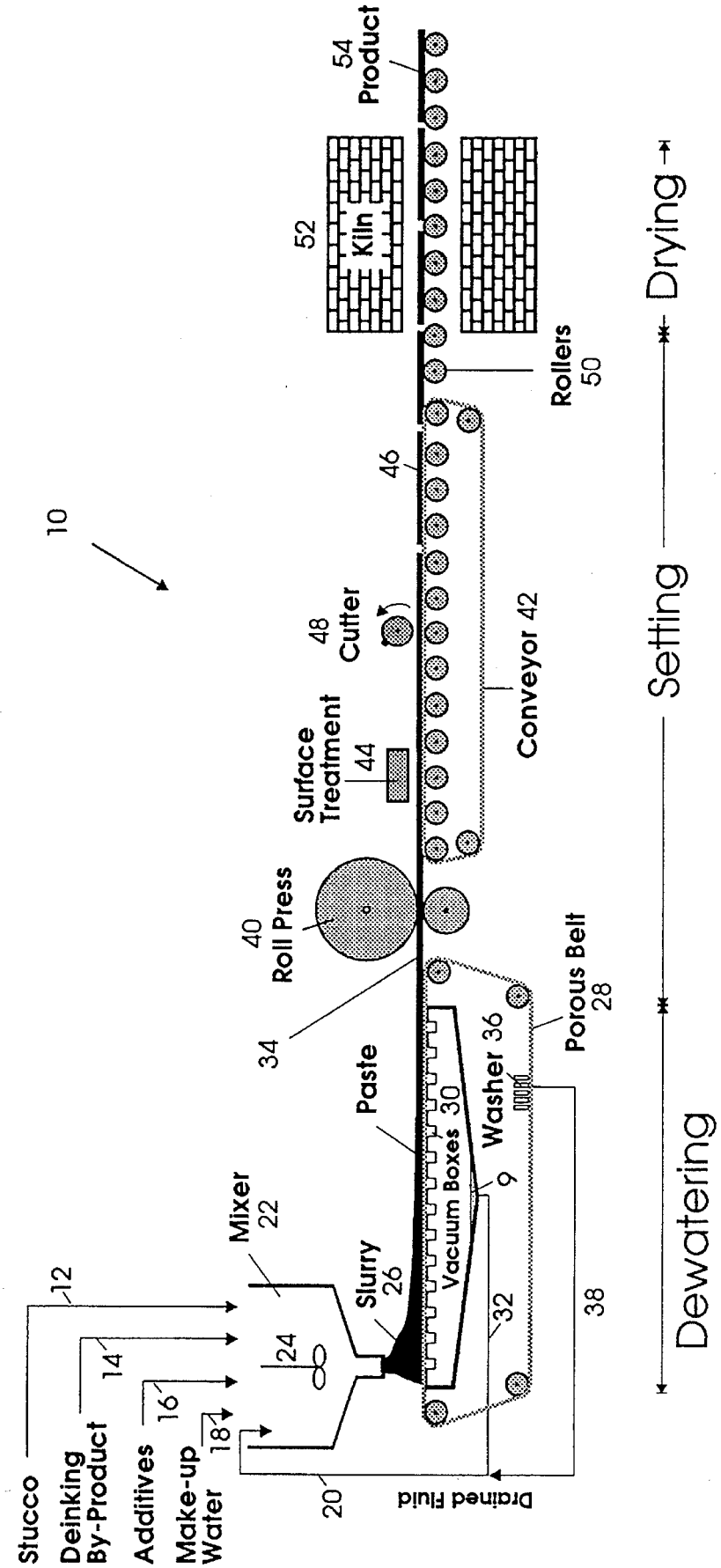
Fig 1. DBP-REINFORCED DRYWALL MANUFACTURING PROCESS

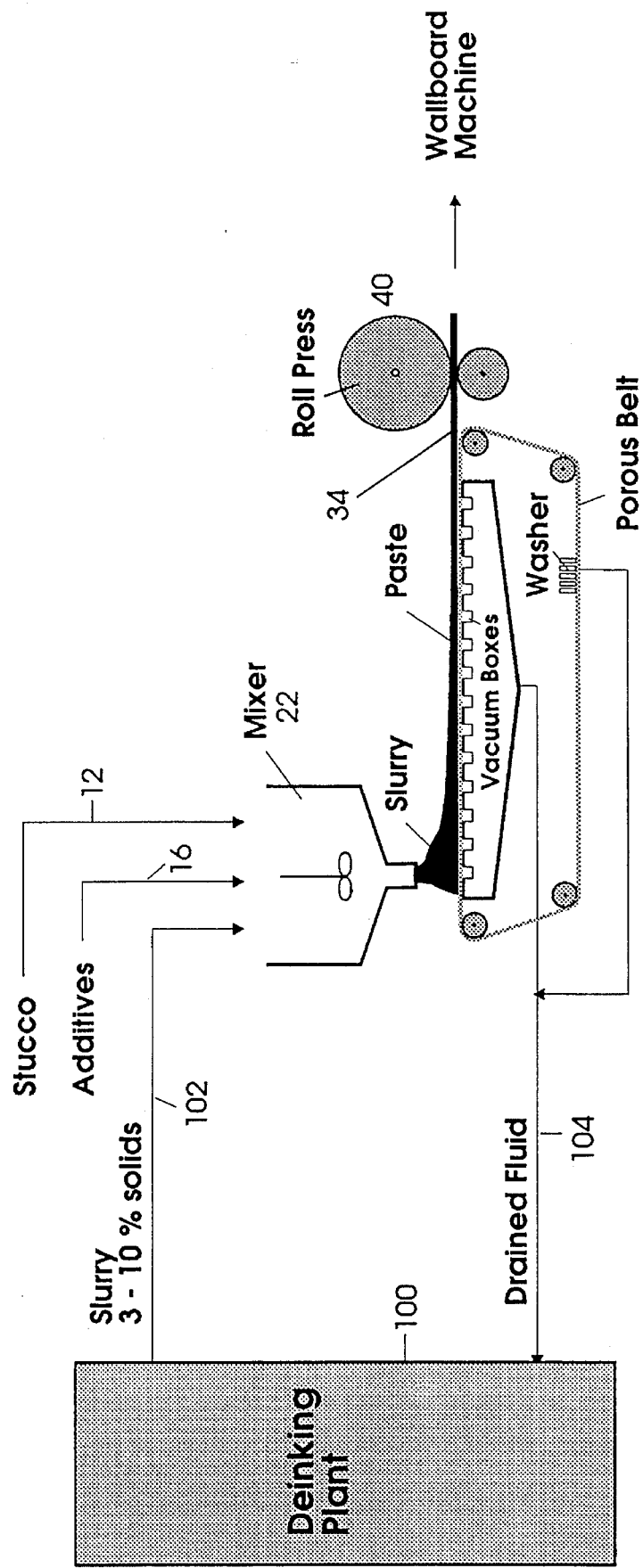
Fig 2. DBP-REINFORCED DRYWALL MANUFACTURING PROCESS IN A DEINKING PLANT

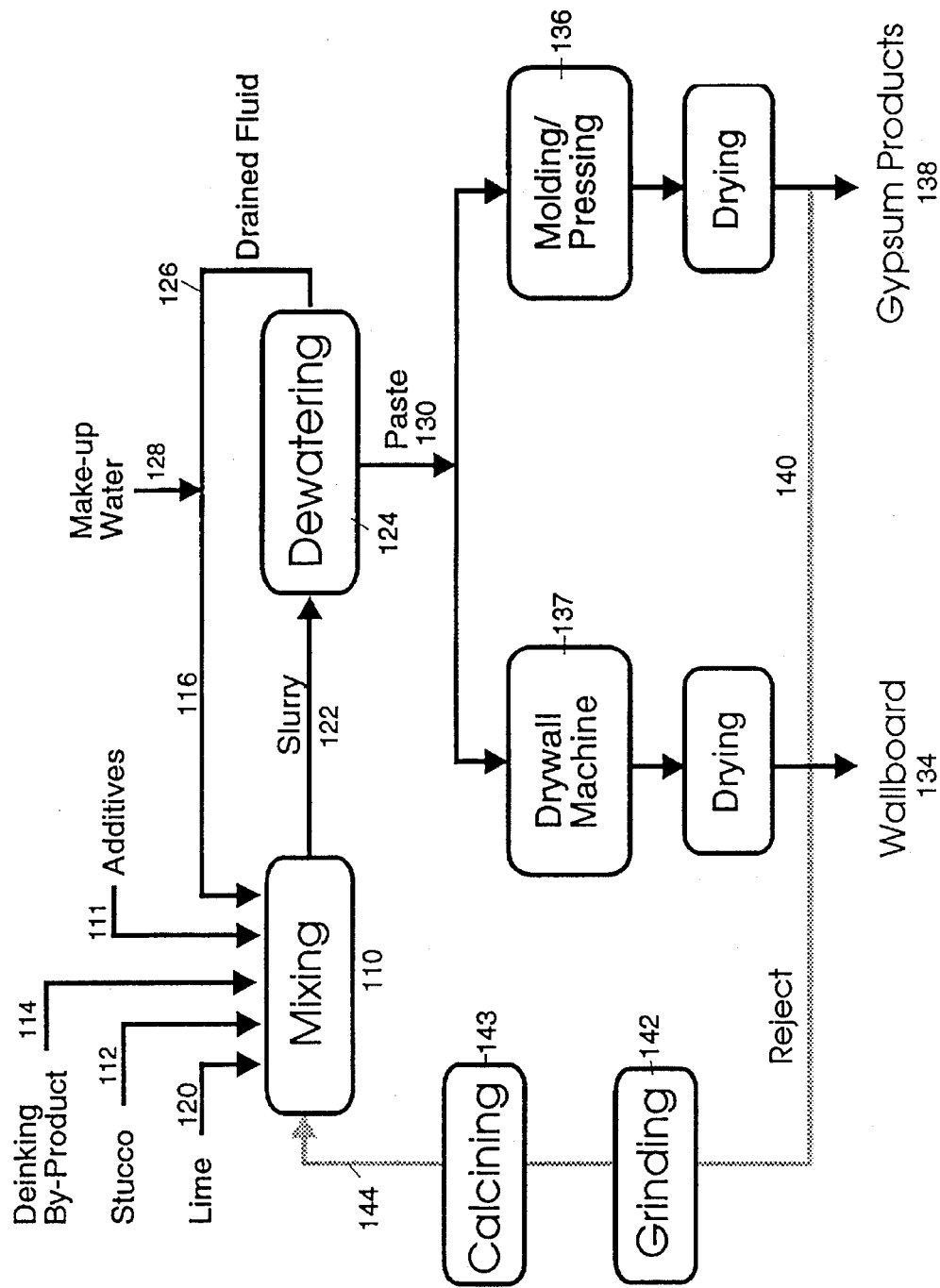
Fig 3. DBP-REINFORCED GYPSUM PRODUCTS - Manufacturing Process Flowsheet

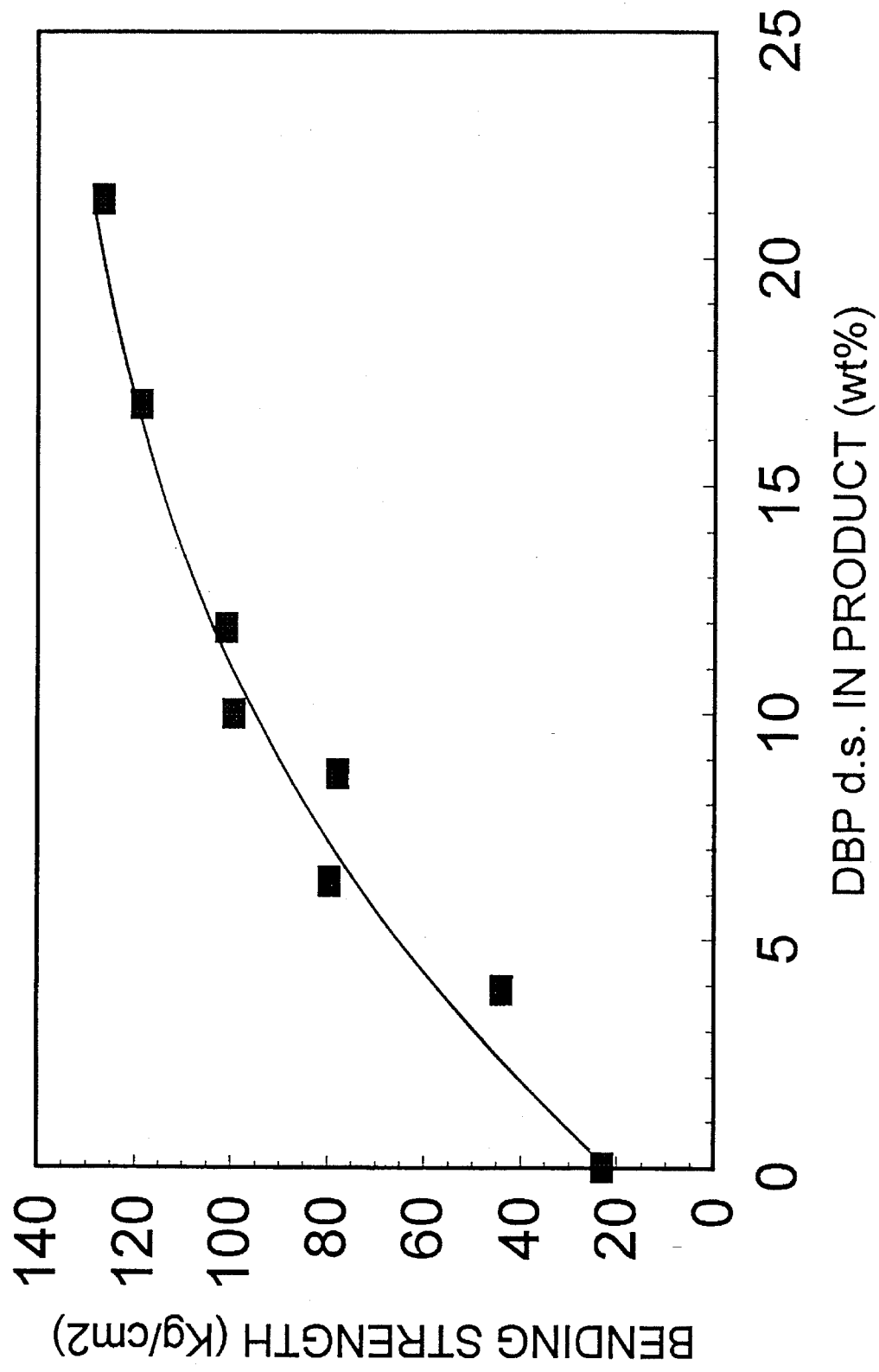

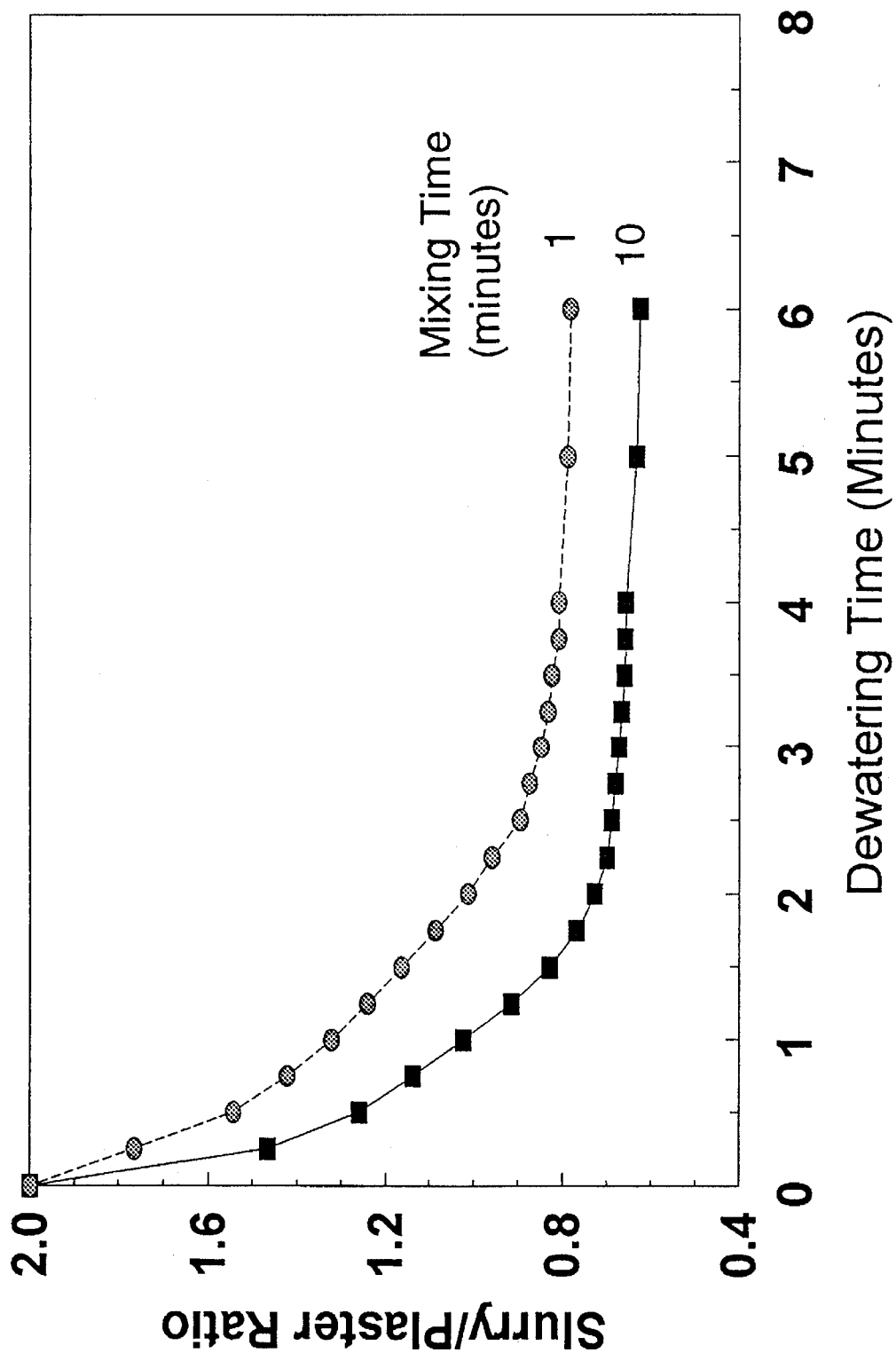

UTILIZATION OF DEINKING BY-PRODUCT IN BUILDING MATERIALS

FIELD OF INVENTION

The present invention relates to the utilization of deinking by-product or sludge and other wood fibre-containing by-products in building materials, particularly drywall and gypsum blocks.

BACKGROUND TO THE INVENTION

Wastepaper is an abundant source of wood fibre which, if recycled, can be a lower-cost alternative to wood pulp in a variety of paper products. Before wastepaper can be reused, however, it is necessary to subject the wastepaper to a deinking procedure to remove inks and coating materials from the wood fibre.

The most commonly employed deinking process is a flotation process in which the wastepaper is washed and treated with dilute sodium hydroxide in a reaction tank, causing the fibres to swell and loosening up the ink and coating material particles, such as clay, calcium carbonate, titanium dioxide and talc. Peroxides and surfactant next are added to bleach and whiten the fibres and to disperse the ink and coating material particles and render them hydrophobic, so that they can attach to rising air bubbles passing through the tank. This action separates the ink particles from the fibres and forms a foam containing ink particles on the surface of the tank.

The foam then is skimmed off the pulp dispersion. The removed ink particles, together with coating material particles, rejects, residual fibres and water, form a slurry of about 3 to 5 wt % solids. This slurry is filtered and dewatered to provide a residue known as deinking sludge, with an about 25 to 55 wt % solids content. This material is referred to herein as deinking by-product (DBP). The solids content of this by-product generally comprises about 60 to 80 wt % organic material, mainly wood fibres, and the balance ash, i.e. coating material particles. The amount and composition of the deinking by-product varies widely with the type of wastepaper recycled and the efficiency of the deinking process employed. For a typical deinking plant of 250 tons/day recycle fibre production capacity, approximately 70 tons/day of deinking by-product is produced.

As the interest in recycling wastepaper has increased greatly in recent years, the disposal of large quantities of deinking by-product has become an important environmental issue. However, none of the three current major means of disposal is particularly satisfactory. Landfilling may become environmentally abusive in the long term. Such landfill sites can be costly since they are required to have liners, leachate collection systems and ground water monitoring systems.

Soil conditioning is an attractive means of disposal, in view of the high organic content of the sludge. However, there remains an uncertainty over the effects of minor components in the deinking by-product on the quality of produce grown on the treated soil, and concern over possible associated health risks.

Incineration is an attractive alternative since landfill requirements for ash disposal are significantly diminished. However, the environmental effects of the gaseous products of incineration are uncertain as is the disposal of the ash.

Gypsum is a hydrous calcium sulphate, having the formula $CaSO_4 \cdot 2H_2O$. Calcined gypsum, i.e. the hemihydrate form, is variously known under the terms plaster of Paris, stucco, calcined plaster and plaster and has the property of hardening or setting upon rehydration. This property is put to a variety of plastering uses and is used to produce a variety of commercial products, including building materials, particularly drywall or wallboard. The term stucco is used herein to refer to calcium sulfate hemihydrate, although any of the other common terms used to describe calcium sulfate hemihydrate may be employed.

A typical drywall manufacturing process involves sandwiching a stucco composition between two paper-board sheets on a continuous ribbon machine. The front surface paperboard is fed continuously with the eventual front surface face-down on a rubber conveyor belt. The edges of this paper sheet are curled up to provide a trough into which a stucco slurry may be poured. The slurry is mixed continuously from stucco powder and water, with a foaming agent usually being added to provide a lower density product. Other ingredients may be added to modify the properties of the slurry.

The mixer in which the slurry is formed also generally is a pump which pumps the slurry onto the forming machine. A portion of the slurry usually is directed from the mixing pump to a high intensity mixer which beats out the entrained air. This higher density material is directed to the ribbon edge to provide a stronger, increased density edge for edge handling protection.

The board backing paper is fed onto the top of the lower ribbon and the board is assembled by passing through a set of rolls which form the board by rolling over the edge of the front paper, placing the backing paper on top and determining the board thickness. A strip of glue is rolled over the rolled-over front paper edge to which the backing paper is adhered.

The board formed in this way is still fluid and needs to be passed through sizing guides to maintain the desired dimensions. As the board passes along the conveyor belt, the plaster gradually sets. Because of density differences within the plaster and because the bottom and top papers relax due to wetting at different rates, the edge and back of the board usually are sprayed with water to prevent the board from rippling or buckling.

The speed of conveying and length of conveyor belt depend on the set time required. For example, the continuous ribbon may travel at about 300 ft/min for about 600 feet, at which point it can be transferred to rollers from the conveyor belt since it is sufficiently set and does not easily deform. The ribbon may travel for about a further 400 feet on the rollers, giving a total set time of 3 to 4 minutes, prior to cutting the ribbon into individual sheets. If chamfered edge board, used for taped joint applications, is required, a separate plastic edge mould strip may be fed along the conveyor belts with the ribbon.

The ribbon is sheared into lengths from 14 to 24 feet and flipped over so that the finished surface is upwards. This arrangement prevents the surface from being marred by rollers in the drying oven. The sheets may be stacked side-by-side or in-line. The groups are fed to a multi-desk drying oven in sequence and removed in the same sequence at the end of the desired drying time. The sheets travel over driven rollers in the ovens and are subjected to hot combustion gases, for example, at about 630° F. to dry the sheets in about 30 minutes residence time. The interior of the sheet is kept cool by water evaporation which prevents the dehydration of the newly-formed gypsum. Sheets exit the drier at about 180° to 200° F. The sheets are restacked face to face and cut to the required lengths for shipping.

SUMMARY OF INVENTION

In accordance with one aspect of the present invention, the deinking by-product from wastepaper recovery operations is used as a component of building materials, particularly as an ingredient in the production of drywall or wallboard or other gypsum products, such as blocks. In the production of the drywall, the deinking by-product may comprise up to about 30% (on a dry weight basis) of the finished drywall. The wood fibres present in the deinking by-product provide flexural strength to the drywall when incorporated therein. The other solid components of the deinking by-product are compatible with the drywall core materials. The deinking by-product may be replaced by a pulp mill clarifier sludge, preferably a primary clarifier sludge, secondary clarifier sludge or combined clarifier sludge from a pulp and paper mill operation.

This aspect of the present invention exhibits several advantages in providing lower deinking by-product disposal costs and the potential for total elimination of deinking by-product disposal problems. The procedure provides no environmental concerns since the deinking by-product is fully-incorporated into the building product. The present invention enables a current waste material, namely deinking by-product, to be converted into a useful product, namely improved construction materials, which have improved product strength with decreased product manufacturing costs. Similar advantage flow from the use of pulp mill clarifier sludge in this way. Accordingly, in one aspect of the present invention, there is provided a building material having incorporated therein a proportion of wood fibre-containing by-product selected from a deinking by-product from a wastepaper recycling operation and a pulp mill clarifier sludge.

Another aspect of the present invention provides a procedure for incorporating cellulosic fibrous material, particularly in the form of deinking by-product and pulp mill clarifier sludge but including other sources of such material, such as virgin or recycled wood pulp, into a gypsum-based building material, by forming an initial dilute slurry of stucco and source of cellulosic fibrous material, permitting an initial hardening of the slurry, then dewatering the slurry to a paste-like consistency, and forming the building material, such as drywall or gypsum block from the dewatered material.

This procedure enables large quantities of cellulosic fibrous material to be incorporated into gypsum-based building materials, while minimizing the water which may need to be evaporated from the building material.

BRIEF DESCRIPTION OF DRAWING

FIG. 1 is a schematic representation of a procedure for the production of drywall incorporating deinking process by-product in accordance with one embodiment of the invention;

FIG. 2 is a schematic representation of a procedure for the production of drywall incorporating deinking process by-product in accordance with another embodiment of the invention;

FIG. 3 is a schematic representation of a procedure for the incorporation of deinking process by-product into fibre-reinforced gypsum products;

FIG. 4 is a graphical representation of the effect of deinking by-product content on product strength, as determined in one of the Examples; and FIG. 5 is a graphical representation of the effect of mixing time on dewatering, as determined in another of the Examples.

GENERAL DESCRIPTION OF INVENTION

The present invention provides an alternative means of disposal of deinking by-product which does not suffer from the disadvantages of current disposal methods, as outlined above. It is estimated that annual drywall production in North America is 15 billion square feet, which is more than sufficient to absorb the total current production of deinking by-product.

At the present time, wastepaper recyclers pay disposal companies to ship deinking by-product for disposal in the manners described above. The present invention enables such currently-useless material to be employed in a commercial product, while avoiding the adverse effects of current disposal procedures and imparting improved properties to the product itself. In addition, in one embodiment, the present invention enables the dewatering step carried out on the skimmed foam to be effected in conjunction with the formation of a structural element.

One particular product into which the deinking by-product may be incorporated is drywall. However, the deinking by-product may be incorporated into other building materials, particularly gypsum-based building materials, such as gypsum blocks, ceiling tiles and acoustic panels.

The deinking by-product may be incorporated into the drywall or other building material by any desired procedure. One such procedure involves an initial dilution of the deinking by-product with water, or other convenient aqueous material, from its initial consistency of about 25 to 55 wt % to a viscosity at which the material is readily stirred, generally about 5 to 10 wt %. Since any extra moisture introduced to the slurry needs to be removed during the drywall formation, it is preferred to employ a minimum amount of added water. If necessary, oxidants, such as hydrogen peroxide ($H_2O_2$), may be added to the slurry to remove any unpleasant odour as well as to whiten the fibres.

To the diluted slurry is added the desired amount of calcium hemihydrate (otherwise known as stucco or plaster of Paris or other terms, as noted above. The term stucco is used herein) corresponding to the relative proportions of gypsum and solid components of the deinking by-product desired in the drywall. One benefit that is imparted by the procedure of the invention is that the deinking by-product tends to maintain the stucco particles in suspension, which permits overall larger volumes of water to be employed and enables a less dense drywall product to be produced than is normally the case. Usually, attempts to provide a less dense product by dilution of the slurry leads to non-uniform distribution of gypsum, as a result of settling of solid materials from the slurry.

After mixing to form a uniform mixture, the mixture then is fed to a drywall making machine in which the stucco becomes hydrated and forms gypsum ($CaSO_4.2H_2O$) and residual moisture is dried from the sheet to provide the final product. Similarly, wood-fibre-reinforced gypsum blocks can also be made by feeding the mixture of deinking by-product and stucco to a gypsum block making machine.

The dilution of the deinking by-product and mixing of the diluted deinking by-product with stucco to form the mixture for feed to the drywall making machine often has the effect of introducing an excess of water above that normally encountered in the slurry feed to a drywall plant, which then requires additional levels of energy to remove this excess moisture, causing a bottleneck in production. One benefit of the procedure of the invention, however, is that it produces low density products without the use of a foaming agent.

In a preferred embodiment of the invention, following formation of the slurry of diluted deinking by-product and stucco, the slurry is subjected to an initial dewatering step to decrease the overall moisture content to a level suitable for drywall production, for example, about 0.75:1 water:stucco, although the range may vary from about 0.5:1 to about 1:1. Preferably, such dewatering operation is effected after an initial holding period of about 2 to about 15 minutes, to permit an initial hardening of the gypsum, which then permits more ready dewatering without undue loss of particulate materials from the mat.

The latter operation permits large loadings of fibre from the deinking by-product into the drywall product, such as up to about 30 wt %, not otherwise readily achievable without excessive energy use. The mixing followed by dewatering procedure also may be effected directly with the slurry skimmed from the flotation separation operation carried out in the deinking plant, so that the dewatering step effected to form the web fed to the drywall plant replaces the conventional dewatering operation to form deinking by-product. This procedure, however, is economically practical only with an on-site drywall-making operation at the deinking plant.

The initial slurry formation followed by dewatering may be effected to produce an initial dewatered mat that has sufficient integrity that outer backing layers of paperboard are not required in the drywall production procedure. The absence of the outer backing layers enables cost reductions to be achieved and also a textured surface to be provided, by a suitable contoured roller engaging the outer surface of the web.

The procedure provided in accordance with this preferred embodiment of the invention enables not only deinking by-product to be employed as a source of cellulosic material fibre reinforcement of drywall and other gypsum-based building materials, but also permits other sources of such material to be employed for such fibre reinforcement, including virgin or recycled wood fibre.

In addition to the deinking by-product which is incorporated into building products herein by the various embodiments of the invention, other cellulosic fibrous material contained in sludge-like by-products of similar composition to deinking by-product may be employed. Such materials may include clarifier sludge from pulp mill waste water treatment.

A typical unbleached Kraft pulp mill of 1000 tons/day produces about 25 to 25 tons/day of combined sludge form the waste water treatment plant. Mill waste water is first fed into a primary treatment clarifier where the majority of suspended solids is removed by sedimentation. The resultant thickened mass is further dewatered to about 30% consistency to provide primary clarifier sludge. The overflow from the primary treatment clarifier is fed into a secondary treatment plant wherein the overflow is aerated and biochemically treated to decrease odour and BOD before being discharged from the pulp mill, while leaving secondary clarifier sludge of about 10% consistency. Some mills have only primary treatment while other mills have both, in which case the sludges usually are mixed to form combined clarifier sludge.

Such pulp mill clarifier sludges often are slightly acidic in nature and, when used with stucco, some lime may be added to provide the pH of the slurry neutral or alkaline, in order to avoid dissolution of gypsum and to minimize the deterioration of fiber.

DESCRIPTION OF PREFERRED EMBODIMENTS

Referring to the drawings, FIG. 1 is a schematic representation of a drywall (or wallboard) manufacturing process 10 whereby deinking by-product is incorporated into the drywall, in accordance with one preferred embodiment of the invention.

As may be seen therein, stucco, deinking by-product from a deinking plant, additives, such as a foaming agent, make-up water and recycled drained liquid are fed respectively by lines 12, 14, 16, 18 and 20 to a mixer 22 fitted with a stirrer 24 wherein the materials are mixed to provide a slurry for discharge from the mixer 22 by line 26.

The components may be added to the mixture in any desired order. It is convenient first to add the deinking by-product, recycled liquid and make-up water to form a dilute slurry of the deinking by-product before addition of the stucco and any additives. Preferably, the dilute slurry has a consistency of about 5 to 10 wt %. Following addition of the stucco, it is preferred to provide a slurry to stucco ratio of about 1:1 to about 1:5. Such mixing generally is effected under ambient temperature conditions, although other temperatures may be employed, if desired.

It is preferred to maintain the slurry in the mixer 22 until the gypsum begins to set, since improved dewatering is obtained thereby in subsequent processing, generally about 2 to about 15 minutes. The onset of such gypsum setting is pre-determined empirically by measuring the time required for the initiation of the hydration of the stucco.

The slurry 26 is discharged from the mixer 22, onto the upper surface of an endless porous belt 28, having a series of vacuum boxes 30 located below the belt 28 to draw liquid from the mat of material on the upper surface of the belt through the belt to a sump 9, from where the extracted liquid is recycled by lines 32 and 20 to the mixer 22. The action of the vacuum boxes 30 on the sheet of material on the upper surface of the belt 28 significantly decreases the moisture content of the mat to provide a sheet of paste-like consistency, having a slurry to stucco ratio of about 0.5:1 to about 1.6:1 on the surface of the belt 28. This sheet 34 then is in a suitable form for passage to a drywall-forming process. The porous belt 28 may be provided on its return run with washing showers 36 to remove fines from the belt, which would otherwise inhibit drainage through the belt. Spent wash water with removed fines is recycled by lines 38 and 20 to the mixer 22.

The sheet of paste-like consistency is passed through the nip of a roll press 40 to compact the sheet and smooth the surface. In a conventional drywall process, outer layers of paper are used as support elements for the gypsum filler both during formation of the gypsum and during subsequent handling. If desired, outer layers of paper also may be employed with the sheet material of the invention, by feeding paper webs through the nip between the roll press 40 to engage upper and lower surfaces of the sheet 34. However, the sheet 34 fed to the drywall forming process may have sufficient integrity and strength to permit such paper webs to be omitted.

The sheet is conveyed by an endless conveyor 42 within the drywall manufacturing operation to permit setting of the gypsum. A surface treatment may be applied to the sheet by a suitable device 44 to obtain desired surface effects, for example, a pattern, on the surface of a sheet to which a paper facing has not been applied. Colouring, printing or the application of plaster to the surface of the sheet also may be effected.

When the sheet 34 has set for a sufficient period, individual length sheets 46 are cut from the web by a suitable cutter 48 and the individual sheets 46 are conveyed on rollers 50 through a drying kiln 52, in which the individual sheets are dried to the desired residual moisture level, to produce the final drywall product 54.

The embodiment of FIG. 1 is an illustration of the adaptation of an existing drywall forming operation to incorporate into the drywall the deinking by-product, generally provided at a high concentration, from about 25 to 55 wt % solids, from the deinking plant. In FIG. 2, there is illustrated an alternative embodiment in which the drywall-forming operation is carried out at the location of the deinking plant. In this embodiment, dewatering of the deinking by-product slurry to a high consistency for discharge from the deinking plant is not required, but rather the slurry is employed in the dilute form skimmed from the flotation operation.

As seen in FIG. 2, deinking slurry of consistency of about 3 to 10 wt %, discharged from a deinking plant 100, is forwarded by line 102 to a mixer 22 (the same reference numerals are employed in reference to FIG. 2 as are used to designate the same elements in FIG. 1), along with stucco and any additives by lines 12 and 16 respectively. In view of the dilute nature of the slurry in line 102, make-up and recycled water are not required. A sheet 34 again is formed on a vacuum conveyor and fed through the nip of a roll press 40 of a drywall making machine. Drained fluid from the sheet formation and belt washing is returned to the deinking plant 100 by line 104.

The embodiments of FIGS. 1 and 2 illustrate the application of the principles of the present invention with respect to the formation of drywall products incorporating the deinking by-product. However, it is within the scope of the invention to incorporate the deinking by-product into other gypsum products. An embodiment of such operation is illustrated in FIG. 3, as described below. The formation of gypsum products is described herein specifically with respect to the incorporation of deinking sludge, which introduces fibrous material to the product. However, the use of the procedure involving a draining operation may be employed with other sources of wood fibre, such as virgin or recycled wood pulp.

As seen in FIG. 3, stucco and deinking by-product are fed to a mixing tank 110 by lines 112 and 114 respectively. The deinking by-product may be dewatered material, as employed in the embodiment of FIG. 1, or non-dewatered material, as employed in the embodiment of FIG. 2. In the former case, dewatered liquid and makeup water may be added to the mixing tank 110 by line 116.

Depending on the gypsum product desired and the procedure to be adopted for the preparation thereof, additives, such as starch, foaming and/or setting agents, and lime, may be added to the mixing tank by lines 118 and 120 respectively. The resulting slurry, preferably after holding for a period sufficient to initiate setting of the gypsum, is forwarded by line 122 to a dewatering operation 124 of any convenient type, depending upon the intended use of the resulting material. The dewatered liquid is recycled by lines 126 and 116 to the mixing tank 110. Make-up water may be added by line 128.

The paste-like material resulting from the dewatering operation is forwarded by line 130 for further processing to form a desired product. For example, the paste may be forwarded to a drywall machine 132 for the formation of wallboard 134, as described above with reference to FIGS. 1 and 2. Alternatively, the paste may be forwarded to a pressing and molding operation 136 to form an acoustic panel, ceiling tile or other gypsum product 138, such as a building block, following suitable drying. Any rejects from such operation may be recycled by line 140 through a grinding operation 142, calcining operation 143, if required, and recycle line 144 to the mixing tank 110.

EXAMPLES

Example 1

This Example illustrates the formation of gypsum products incorporating deinking by-product.

Several tests were carried out in which varying proportions of deinking by-product (DBP) and stucco were mixed by first diluting the deinking by-product with water to a consistency of about 20% and then mixing in stucco to form a uniform dispersion. The dispersions were set in test vessels and their relative strengths were examined. The results obtained are set forth in the following Table I:

TABLE I

SUMMARY OF EXAMPLE 1 TEST RESULTS

| Test No. | Slurry Conc. (%) | Water (g) | Stucco (g) | P/(S + W) Weight Ratio | (S + W)/P Weight Ratio | PRODUCT Density (g/cm³) | Dry DBP (wt %) | Relative Strength |
|---|---|---|---|---|---|---|---|---|
| 1 | — | 75 | 35 | 0.47 | 2.1 | 6 | 0 | 1 |
| 2 | 30 | — | 35 | 0.47 | 2.1 | 1.4 | 28.8 | 3.5 |
| 3 | 30 | — | 25 | 0.33 | 3.0 | 1.2 | 36.1 | 2.5 |
| 4 | 30 | — | 10 | 0.33 | 5 | 0.75 | 49.0 | 0.5 |

Notes: P = Stucco, S = Slurry, W = Water, DBP = Deinking by-product.

As may be seen from this data, significant quantities of fibre contained in deinking by-product may be incorporated into the gypsum and provide an increased product strength (Tests 2 and 3), unless excessive quantities are used (Test 4).

Example 2

This Example illustrates the effect of quantities of deinking by-product on strength of product.

A 5 wt % of DBP slurry was prepared by adding a required amount of water into a DBP mass which contained about 50 wt % solid. An appropriate amount of stucco was added to the 5% DBP slurry at a slurry-to-plaster ratio of 1.6:1. This ratio was chosen so as to result in a final product with a density of 0.64 to 0.68 g/cm³, comparable to that of conventional drywall. The resulting mixture was well stirred for about 1 minute and then poured into rectangular mould. The mixture was allowed to set in the mould at room temperature for 30 to 60 minutes before being removed from the mould and dried in an oven preheated at 60° C. The resulting slab, which had a dimension of 1'×½"×5", was subjected to strength testing using a three-point bending strength tester. The results obtained are set forth in FIG. 4.

As may be seen from the data presented in FIG. 4, the strength of the product increased as the quantity of DBP in the final product increased.

Example 3

This Example illustrates the effect of dewatering.

A 5 wt % slurry of deinking by-product (DBP) was prepared by adding the necessary quantity of water into a DBP mass which contains about 50 wt % solids. In a series of experiments, stucco was added to the slurry to provide varying ratios of slurry-to-plaster varying from 1:1 to 5:1. The resulting mixtures were well stirred until the time at which the plaster began to set, after about 10 minutes. (This time period may vary with the type of plaster used). A series of mixtures also was prepared in which the mixing time was approximately 1 minute.

The mixtures, which were still in the form of a slurry, were poured into a cylindrical mould with a piece of filter paper or cloth at the bottom. The mould was connected to a vacuum dewatering device, so that excess water in the mixtures could be removed. Following removal of the water in this way, the mixtures, which were paste-like at this stage, were removed from the mould, allowed to set at room temperature for a few minutes, the bottom cloth or filter paper was removed, before the solid masses were dried in an oven preheated to 60° C.

The effect of the mixing time and dewatering time on the final slurry-to-plaster ratio obtained is depicted in FIG. 5. As may be seen, a longer mixing time, permitting the plaster to start hardening, makes the material easier to dewater.

The results obtained in the series of experiments are set forth in the following Table II:

TABLE II

SUMMARY OF EXAMPLE 3 TEST RESULTS

| | Slurry | S/P RATIO | | PRODUCT | | |
|---|---|---|---|---|---|---|
| No. | Conc. (%) | Initial | After Dewatering | Density (g/cm³) | Dry DBP (wt %) | Remarks |
| 1 | 5 | 1* | 0.35 | 1.6 | 0 | Very hard, brittle, cannot be dented with finger nails |
| 2 | 5 | 1 | 0.43 | 1.4 | 4.0 | Very hard, cannot be dented with finger nails |
| 3 | 5 | 2 | 0.64 | 1.2 | 7.9 | Very hard, cannot be dented with finger nails |
| 4 | 5 | 3 | 0.75 | 0.75 | 11.3 | Hard, light, cannot be dented with finger nails |
| 5 | 5 | 2 | 0.63 | 1.2 | 7.9 | Very hard, cannot be dented with finger nails |
| 6 | 5 | 2 | 0.63 | 0.65 | 7.9 | **Hard, light, dented with finger nails |
| 7 | 5 | 2 | 0.54 | 1.5 | 7.9 | Very hard, cannot be not dented with finger nails |
| 8 | 5 | 3 | 0.85 | 1.0 | 11.3 | Hard, cannot be not dented with finger nails |
| 9 | 5 | 3 | 0.90 | 1.0 | 12.4 | Hard, cannot be not dented with finger nails |
| 10 | 5 | 4 | 1.1 | 0.97 | 14.4 | Hard, cannot be not dented with finger nails |
| 11 | 5 | 5 | 1.2 | 0.87 | 17.4 | Hard, cannot be not dented with finger nails |
| 12 | 5 | 5 | 1.3 | 0.74 | 20.9 | Hard, light, porous, dented easily with finger nails |
| 13 | 10 | 3 | 0.97 | 0.87 | 22 | Hard, light, can be dented with finger nails |
| 14 | 10 | 4 | 1.1 | 0.79 | 29 | Hard, light, can be dented with finger nail |
| 15 | 10 | 5 | 2.0 | 0.58 | 34 | Hard, light, porous, dented easily with finger nails |

Note: P = Stucco, S = Slurry, * = Only water (no DBP), ** = Contained 10 wt % recycled material.

While the actual strength of the products was not measured, the products obtained in this Example were much stronger than those obtained in Example 2, and hence represent a higher density product.

As may be seen from the data presented in this Table II, the slurry-to-plaster ratio of the paste can be decreased to as low as 0.54 to produce a hard product. This ratio compares to that employed in the conventional drywall process (about 0.75). The ability to produce a product at a lower slurry-to-paste ratio means that there is less water to be removed and, therefore, there is a lower energy cost for drying. In addition, the hard product which is produced indicates that drywall may be produced without the necessity for outer layers of paper.

SUMMARY OF DISCLOSURE

In summary of this disclosure, the present invention provides a novel procedure to enable significant quantities of deinking by-product (sludge) from wastepaper recycling operations and pulp mill clarifier sludge to be incorporated into building materials, particularly as an additive to drywall and gypsum blocks to provide wood-fiber-reinforced products having improved flexural strength. A novel procedure for forming the building material enables other sources of cellulosic fibrous material to be used in the provision of the building materials. Modifications are possible within the scope of this invention.

What I claimed is:

1. A method for the production of a building material, which comprises:

providing a deinking waste sludge from the deinking of wastepaper in a wastepaper recycling procedure comprising a water dispersion having a consistency of about 25 to about 55 wt. % in which the dispersed phase is about 60 to about 80 wt. % organic material and the balance ash, diluting said deinking waste sludge from a wastepaper recycling procedure to a viscosity at which it can be readily stirred and to a consistency of about 5 to about 10 wt. %, adding calcium sulfate hemihydrate to said diluted deinking by-product to provide a slurry of calcium sulfate hemihydrate and said diluted deinking by-product having a diluted by-product to calcium sulfate hemihydrate ratio of about 1:1 to about 1:5, dewatering said slurry to a paste-like mass having a weight ratio of slurry to calcium sulfate of about 0.5:1 to about 1.6:1 for building product formation, and forming a building product from said paste-like mass.

2. The method of claim 1 wherein said building material is drywall.

3. The method of claim 1 wherein said building material is a building block, an acoustic panel or a ceiling tile.

4. A method for the production of a building material, which comprises:

providing a deinking waste sludge from the deinking of wastepaper in a wastepaper recycling procedure comprising a water dispersion having a consistency of about 25 to about 55 wt. % in which the dispersed phase is about 60 to about 80 wt. % organic material and the balance ash, diluting said deinking water sludge to provide a dilute slurry of consistency of about 5 to about 10 wt. %, adding calcium sulfate hemihydrate to said dilute slurry to provide a further slurry having a diluted by-product to calcium sulfate hemihyrate ratio of about 1:1 to about 1:5, providing sufficient time from about 2 to about 15 minutes for said further slurry to initiate hardening of said calcium sulfate hemihydrate, dewatering said further slurry to a paste-like mass having a weight ratio of further slurry to calcium sulfate of about 0.5:1 to about 1.6:1 for building product formation, and forming said building product from said dewatered paste-like mass.

5. The method of claim 4 wherein said building material is drywall.

6. The method of claim 4 wherein said building material is a building block, an acoustic panel or a ceiling tile.

7. A method for the production of a building product, which comprises:

forming a deinking waste sludge comprising a dilute slurry of water, fibrous material and particulates having a consistency of about 3 to about 10 wt. % by a deinking process in a wastepaper recycling operation, mixing said dilute slurry with calcium sulfate hemihydrate to form a further slurry having a dilute slurry to calcium sulfate hemihydrate ratio of about 1:1 to about 1:5, providing sufficient time from about 2 to about 15 minutes for said further slurry to initiate hardening of said calcium sulfate hemihydrate, dewatering said further slurry to a paste-like mass having a weight ratio of slurry to calcium sulfate of about 0.5:1 to about 1.6:1 for building product formation, and forming said building product from the dewatered paste-like mass.

8. The method of claim 7 wherein said building product is drywall.

9. The method of claim 7 wherein said building product is a building block, a acoustic panel or a ceiling tile.

10. A shaped building article comprising gypsum and having uniformly distributed therein a proportion of deinking waste sludge from the deinking of wastepaper in a wastepaper recycling operation, said deinking waste sludge comprising, prior to incorporation into said shaped building article, a water dispersion of fibrous material and particulates having a consistency of about 25 to about 55 wt. % and in which the dispersed phase comprises about 60 to about 80 wt. % organic material and the balance ash, which is prepared by the method of claims 1, 4 or 7.

11. The building material of claim 10 which is drywall.

12. The building material of claim 10 which is a building block, an acoustic panel or a ceiling tile.

* * * * *